(12) United States Patent
Butler

(10) Patent No.: US 9,585,429 B2
(45) Date of Patent: Mar. 7, 2017

(54) BRA MEASUREMENT SYSTEM

(71) Applicant: Sheila Butler, Brooklyn, NY (US)

(72) Inventor: Sheila Butler, Brooklyn, NY (US)

(*) Notice: Subject to any disclaimer, the term of this patent is extended or adjusted under 35 U.S.C. 154(b) by 161 days.

(21) Appl. No.: 14/729,935

(22) Filed: Jun. 3, 2015

(65) Prior Publication Data
US 2015/0342278 A1 Dec. 3, 2015

Related U.S. Application Data

(60) Provisional application No. 62/007,033, filed on Jun. 3, 2014.

(51) Int. Cl.
*A41H 1/02* (2006.01)
*G01B 3/10* (2006.01)

(52) U.S. Cl.
CPC ........ *A41H 1/02* (2013.01); *G01B 3/10* (2013.01)

(58) Field of Classification Search
CPC ............... A41H 1/02; A41H 1/10; G01B 3/10
USPC .......................................................... 33/512
See application file for complete search history.

(56) References Cited

U.S. PATENT DOCUMENTS

| | | | | |
|---|---|---|---|---|
| 405,614 A * | 6/1889 | Stearns | ..................... | A41H 1/02 33/15 |
| 545,139 A * | 8/1895 | Start, Jr. et al. | ......... | A41H 1/02 33/14 |
| 1,407,228 A * | 2/1922 | Smith | ..................... | A41H 1/02 33/15 |
| 2,180,180 A * | 11/1939 | Versoy | ..................... | A41H 1/10 450/68 |
| 2,199,530 A * | 5/1940 | Thompson | ............. | A61B 5/107 33/15 |
| 2,575,343 A * | 11/1951 | Heiman | ................... | A41H 1/02 33/2 R |
| 2,858,832 A * | 11/1958 | Loeffel | ..................... | A41H 1/10 33/15 |
| 2,867,216 A * | 1/1959 | Champagne | ............. | A41H 1/10 450/34 |
| 2,946,125 A * | 7/1960 | Gittelson | ................. | A41H 1/02 33/2 R |
| 4,211,011 A * | 7/1980 | Jacobson | ................. | A41H 1/02 33/15 |
| 4,868,990 A * | 9/1989 | Steinberg | ................. | A41H 1/10 33/15 |
| 5,485,855 A * | 1/1996 | Shiraiwa | .................. | A41H 1/02 33/511 |
| 8,397,391 B2 * | 3/2013 | Ohly | ........................ | A41C 3/00 33/17 R |

* cited by examiner

*Primary Examiner* — Christopher Fulton

(57) ABSTRACT

A bra measurement system includes a left bra wing, a right bra wing, a breast plate, a left bra strap, and a right bra strap. The left bra wing and the right bra wing are connected with the breast plate opposite of each other so that the bra measurement system can be attached around the wearer body. The left bra strap and the right bra strap connect between the left bra wing and the breast plate and the right bra wing and the breast plate respectively. A plurality of fitting zippers of the left bra wing and the right bra wing allows a bra fitting specialist to get the correct girth measurements of the wearer while a plurality of additional zippers of the breast plate enables the bra fitting specialist to get the correct measurement of the cup sized and the cleavage of the breasts. Then the measurements can be used to create a customized bra that fits the respective individual.

12 Claims, 5 Drawing Sheets

BRA MEASUREMENT SYSTEM

The current application claims a priority to the U.S. Provisional Patent application Ser. No. 62/007,033 filed on Jun. 3, 2014.

FIELD OF THE INVENTION

The present invention relates generally to the field of undergarment. More specifically, the present invention is a bra measurement system that is utilized to take measurement of the breasts to create a customized bra.

BACKGROUND OF THE INVENTION

Obtaining a correct bra size is often difficult for a majority of women whose breasts are asymmetrical to some degree. Generally, it is recommended that women should wear a bra fitted to the larger breast and use padding for the smaller or shorten breast to avoid gapping. This method can be useful to overcome slight differences in the breasts. However, this is not a practicable solution for women who display a persistent and visible breast asymmetry that is defined as differing in size by at least one cup size. In order to overcome this problem, some bras are made with different cup sizes, where the first cup may be larger or smaller in size compared to the second cup. However, different cup sized bras still are not able to fully solve this problem as they only correspond with the industry standard measurements. In other words, these bras do not provide a customized fitting for the user. Additionally, women with large breasts also have difficulties finding the correct bra that fits. These problems in relation to the garment industry create a need for a measurement system so that the correct fitting for a bra can be created with individual customization.

It is an object of the present invention to provide a bra measurement system that allows an individual to measure any imperfection related to breasts. More specifically, the present invention is an undergarment and utilizes a plurality of zippers that is placed adjacent to the breasts and the ribcage so that the correct measurements can be taken with respect to the breasts of the wearer. Then the measurements are used to create a customized bra for the respective individual.

DETAIL DESCRIPTIONS OF THE INVENTION

All illustrations of the drawings are for the purpose of describing selected versions of the present invention and are not intended to limit the scope of the present invention.

Figure 1:
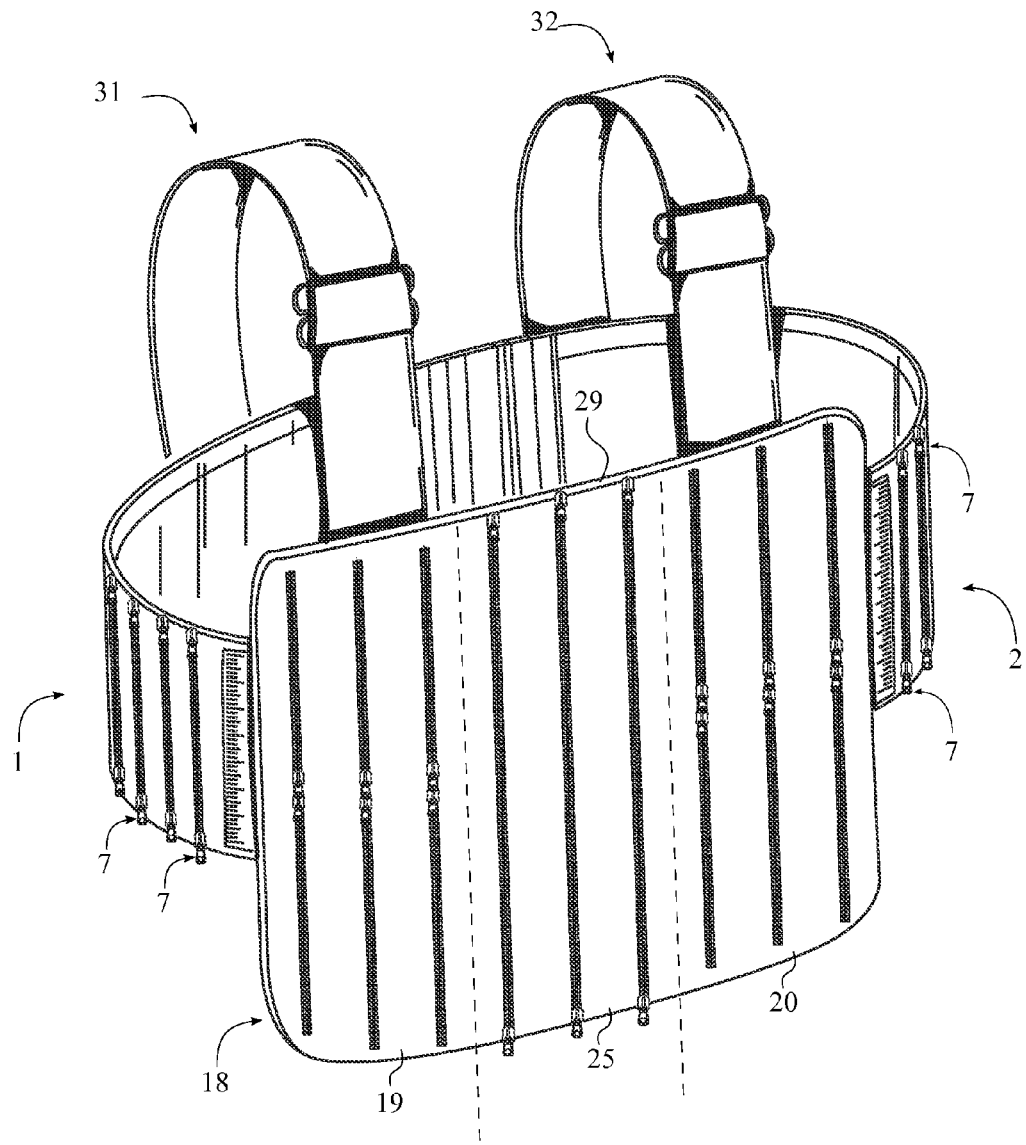
FIG. 1 is a perspective view of the present invention.

The present invention is a bra measurement system that allows a bra fitting specialist to get the correct measurements of an individual's breasts in order to create a customized bra. By utilizing the present invention, the bra fitting specialist is able to measure asymmetrical breasts, larger sized breasts, and any other measurable differences in the breasts. Then the measurements are utilized to create a customized bra that provides a perfect fit for an individual's breasts. The present invention comprises a left bra wing 1, a right bra wing 2, a breast plate 18, a left bra strap 31, and a right bra strap 32. In reference to FIG. 1 that shows the general configuration of the present invention, the left bra wing 1 and the right bra wing 2 are oppositely positioned of each other and connected with the breast plate 18. The left bra strap 31 is connected between the left bra wing 1 and a top edge 29 of the breast plate 18 while the right bra strap 32 is connected between the right bra wing 2 and the top edge 29 of the breast plate 18. The left bra wing 1 and the right bra wing 2 each comprise a plurality of fitting zippers 7 that allows a bra fitting specialist to measure the correct girth measurement of the wearer. Furthermore, the bra fitting specialist utilizes a plurality of additional zippers that is positioned on the breast plate 18 to measure the correct cup size and the correct cleavage of the breasts.

Figure 2:
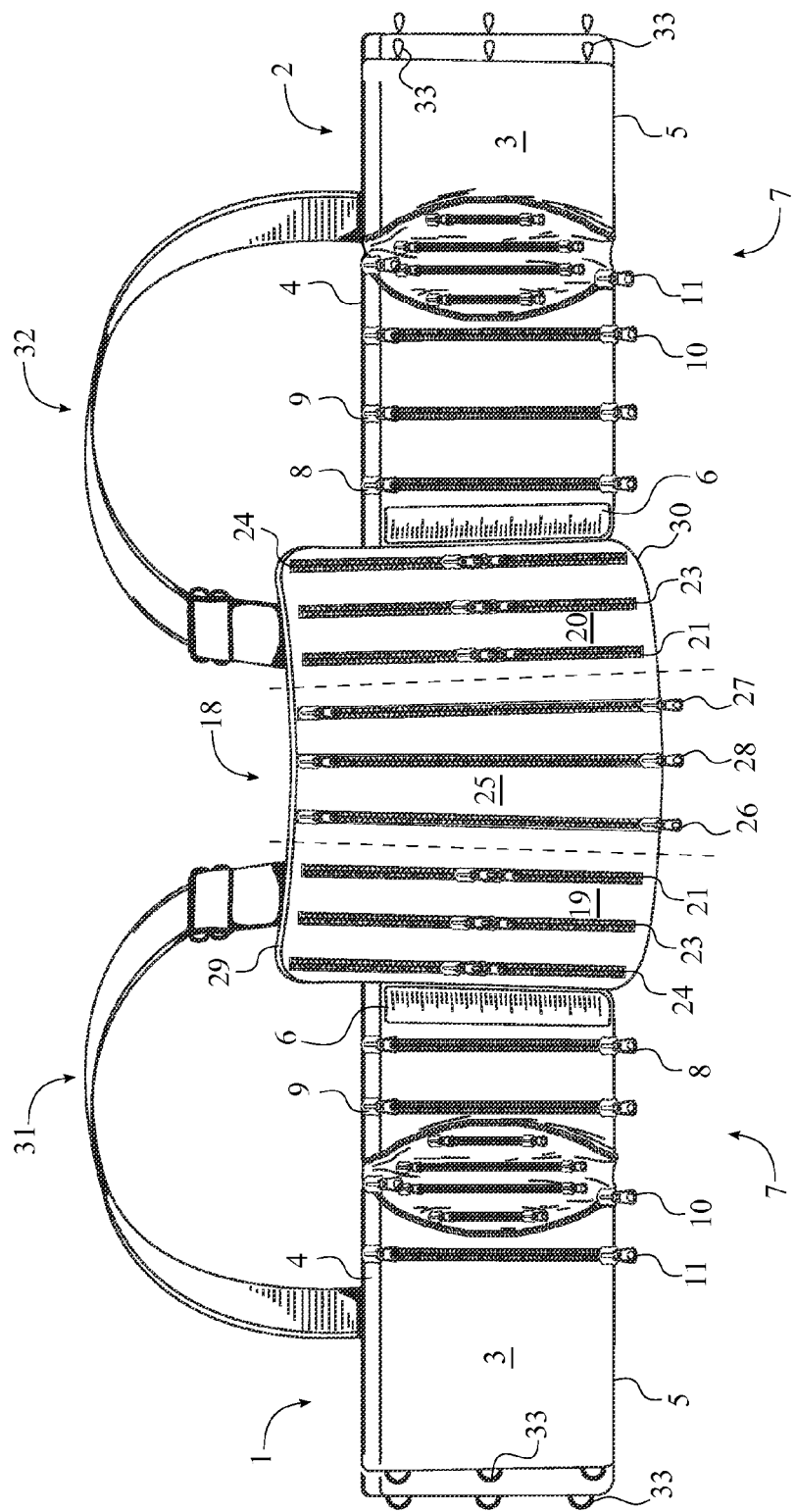
FIG. 2 is a front view of the present invention, wherein the left bra wing and the right bra wing are opened and two of the fitting zippers are opened.

The breast plate 18 generally covers the breasts area of the wearer when the present invention is worn so that the bra fitting specialist can get individual measurements for each breasts. In reference to FIG. 1 and FIG. 2, the breast plate 18 comprises a left breast panel section 19, a right breast panel section 20, and a center panel section 25. The left breast panel section 19 covers the left breast of the wearer and is adjacently connected with the center panel section 25. The left breast panel section 19 allows the bra fitting specialist to determine the correct coverage area for the left breast through the plurality of additional zippers. Similarly, the right breast panel section 20 covers the right breast of the wearer as the right breast panel section 20 is adjacently connected with the center panel section 25 and positioned opposite of the left breast panel section 19. The right breast panel section 20 allows the bra fitting specialist to determine the correct coverage area for the right breast through the plurality of additional zippers. The center panel section 25 that is positioned in between the left breast panel section 19 and the right breast panel section 20 allows the bra fitting specialist to determine the correct cleavage through the plurality of additional zippers.

The left bra wing 1 and the right bra wing 2 secure the breast plate 18 around the body of the wearer as the left bra wing 1 is adjacently connected with the left breast panel section 19 and the right bra wing 2 is adjacently connected with the right breast panel section 20. In order to secure the present invention around the body of the wearer, the left bra wing 1 and the right bra wing 2 utilize a plurality of fasteners 33 that attaches the left bra wing 1 and the right bra wing 2 together. The present invention preferably utilizes a hook and eyelet back closure system as the plurality of fasteners 33, however, the present invention can use any other type of detachable fasteners as the plurality of fasteners 33. In reference to FIG. 2 and FIG. 3, the left bra wing 1 and the right bra wing 2 each further comprises a side panel 3, a top bra band 4, a bottom bra band 5, and a measuring tape 6.

The side panel 3 provides stretchable material that extends around the torso of the wearer while the top bra band 4 and the bottom bra band 5 are oppositely extended along the side panel 3. The top bra band 4 and the bottom bra band 5 are created with additional material along the side panel 3. As a result of placement of the top bra band 4 and the bottom bra band 5, the left bra wing 1 and the right bra wing 2 are able to provide the strongest support without having so much stretch. The measuring tape 6 is connected onto the side panel 3. More specifically, the measuring tape 6 is positioned between the top bra band 4 and the bottom bra band 5 and adjacent to the breast plate 18 so that that the measuring tape 6 can aid the bra fitting specialist to get correct measurements of the plurality of fitting zippers 7. The plurality of fitting zippers 7 is integrated onto the side panel 3 as the plurality of fitting zippers 7 extends from the top bra band 4 to the bottom bra band 5.

The plurality of fitting zippers 7 allows a bra fitting specialist to measure the correct girth measurement of a wearer and comprises a first fitting zipper 8, a second fitting zipper 9, a third fitting zipper 10, and a fourth fitting zipper 11. In reference to FIG. 3, the first fitting zipper 8 is adjacently positioned with the breast plate 18 while the second fitting zipper 9 is positioned adjacent to the first fitting zipper 8, opposite of the breast plate 18. Similarly, the third fitting zipper 10 is positioned adjacent with the second fitting zipper 9 and opposite of the first fitting zipper 8 while the fourth fitting zipper 11 is positioned adjacent to the third fitting zipper 10 and opposite of the second fitting zipper 9. The first fitting zipper 8, the second fitting zipper 9, the third fitting zipper 10, and the fourth fitting zipper 11 provide different girth measurement ranges for the present invention so that the correct girth measurement of the wearer can be identified by manipulating each of the plurality of fitting zippers 7. For example, if the first fitting zipper 8 represents 30 inches of a girth measurement, the second fitting zipper 9, the third fitting zipper 10, and the fourth fitting zipper 11 respectively represent 33, 37, and 41 inches of girth measurements.

Figure 3:
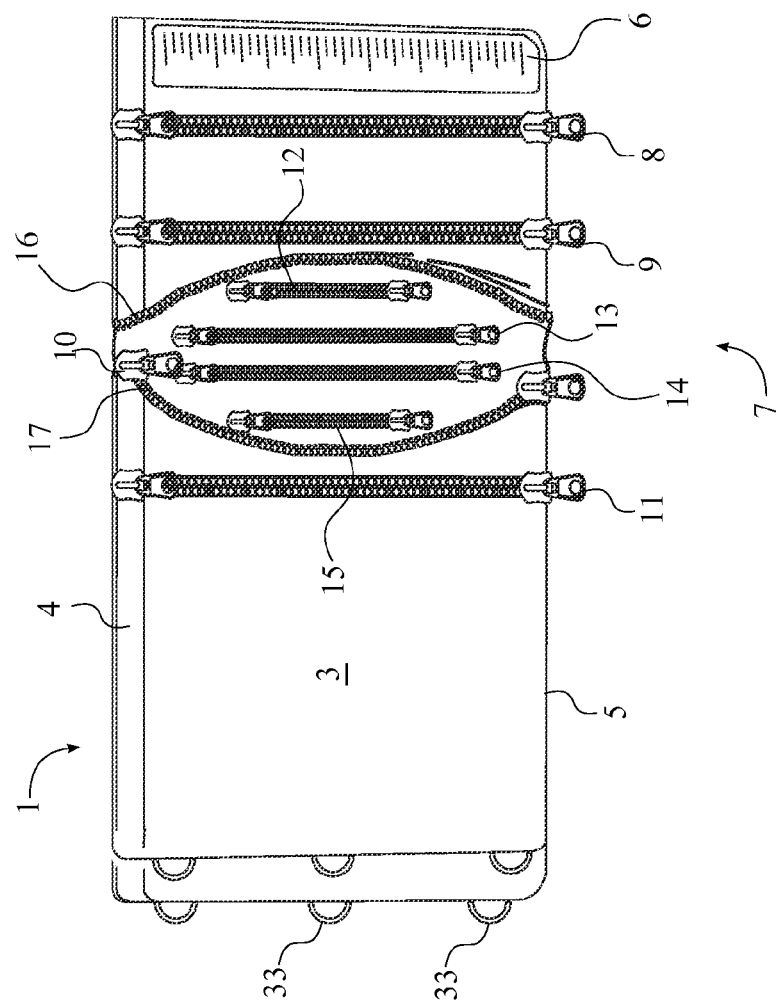
FIG. 3 is a detail view of the left bra wing, showing the increment zippers within the fitting zipper.

In reference to FIG. 3, the first fitting zipper 8, the second fitting zipper 9, the third fitting zipper 10, and the fourth fitting zipper 11 each comprise a first zipper half 16, a second zipper half 17, a first increment zipper 12, a second increment zipper 13, a third increment zipper 14, and a fourth increment zipper 15. The first zipper half 16 and the second zipper half 17 create two way opened-ended zippers so that the first increment zipper 12, the second increment zipper 13, the third increment zipper 14, and the fourth increment zipper 15 that are enclosed by the first zipper half 16 and the second zipper half 17 can be accessed. The first zipper half 16 and the second zipper half 17 are engaged through a retainer pin and a retainer box so that the each of the plurality of fitting zippers 7 can be completely opened and closed. The first increment zipper 12, the second increment zipper 13, the third increment zipper 14, and the fourth increment zipper 15 add a specific girth increment to each of the plurality of fitting zippers 7; however they can only be accessed if the respective fitting zipper is opened. More specifically, the first increment zipper 12 is adjacently positioned with the first zipper half 16 and the second increment zipper 13 is adjacently positioned with the first increment zipper 12, opposite of the first zipper half 16. Additionally, the third increment zipper 14 is adjacently positioned with the second increment zipper 13, opposite of the first increment zipper 12. The fourth increment zipper 15 is adjacently positioned with the third increment zipper 14 and positioned opposite of the second increment zipper 13 and adjacent to the second zipper half 17. For example, if the first fitting zipper 8 represents 30 inches of a girth measurement, the first increment zipper 12, the second increment zipper 13, the third increment zipper 14, and the fourth increment zipper 15 respectively represent 31.25 31.75, 32.25, and 32.75 inches of girth measurements.

Figure 4:
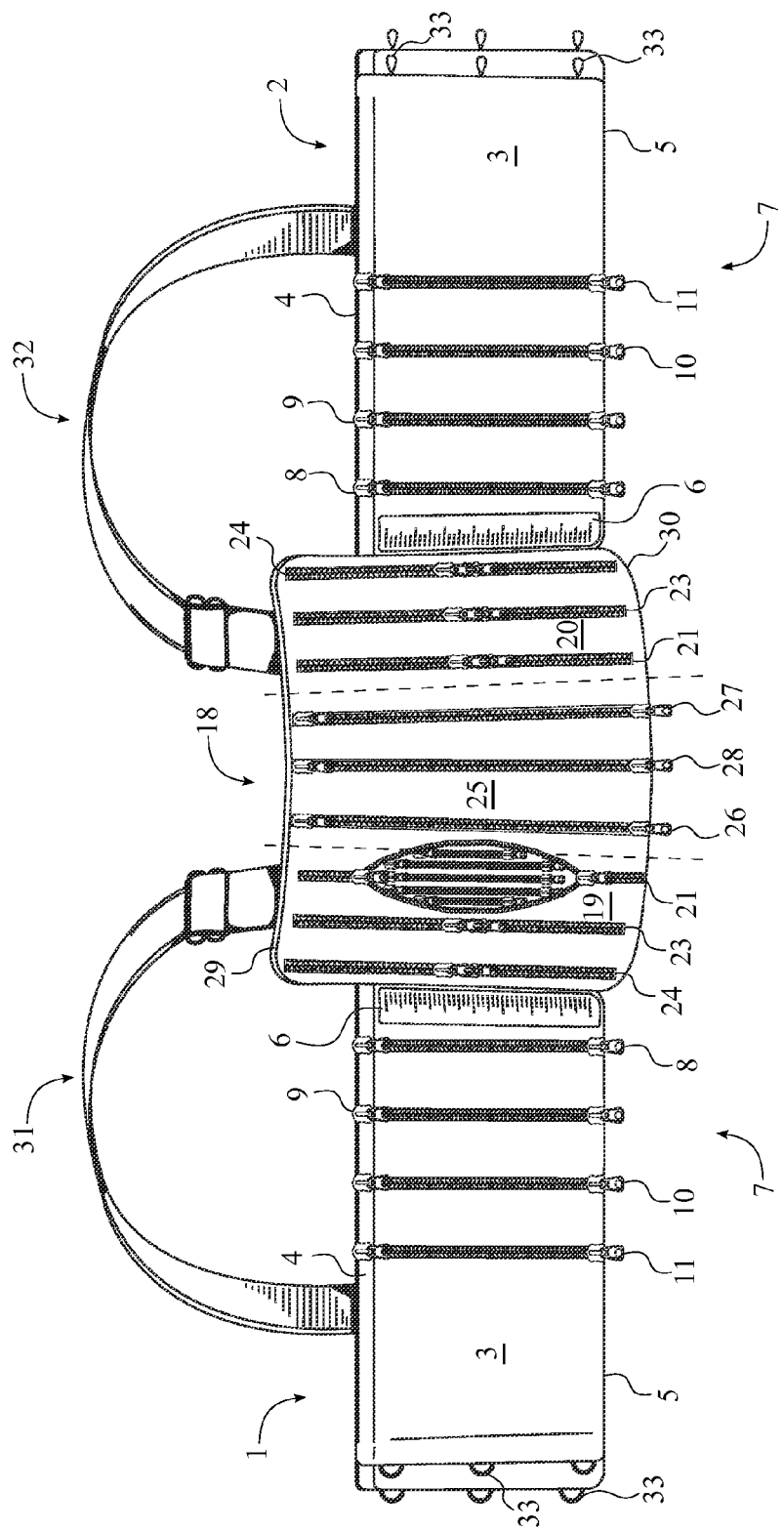
FIG. 4 is a front view of the present invention, wherein the first cup fitting zipper is opened.
Figure 5:
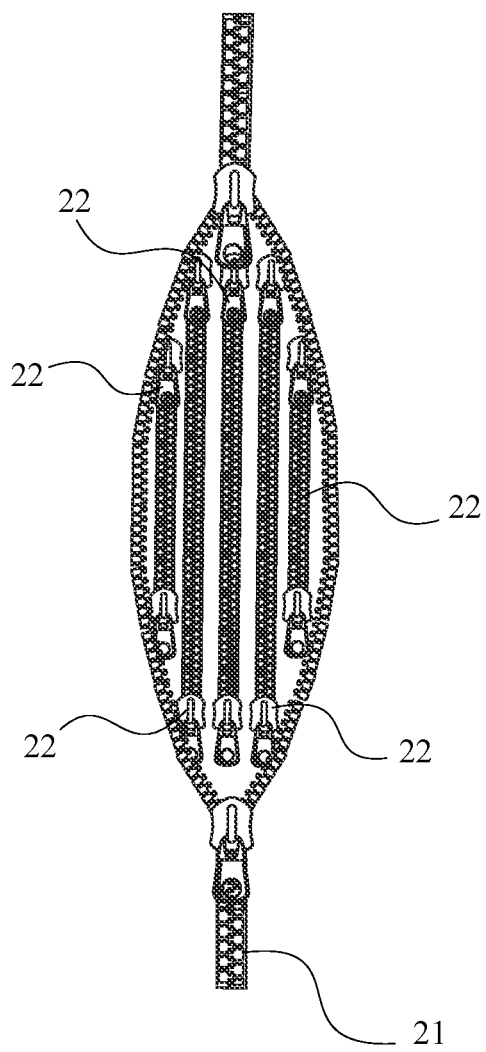
FIG. 5 is a front opened view of the first cup fitting zipper, showing the plurality of placement zippers.

In reference to FIG. 4 and FIG. 5, the left breast panel section 19 and the right breast panel section 20 each comprise a first cup fitting zipper 21, a second cup fitting zipper 23, and a third cup fitting zipper 24 so that the left breast measurements and the right breast measurements can be individually measured. The first cup fitting zipper 21, the second cup fitting zipper 23, and the third cup fitting zipper 24 are extended from the top edge 29 of the breast plate 18 to a bottom edge 30 of the breast plate 18. The first cup fitting zipper 21 is adjacently positioned with the center panel section 25. The second cup fitting zipper 23 is adjacently positioned with the first cup fitting zipper 21 and positioned opposite of the center panel section 25. The third cup fitting zipper 24 is adjacently positioned with the second cup fitting zipper 23 and positioned opposite of the first cup fitting zipper 21. More specifically, the present invention utilizes two-way zippers as the first cup fitting zipper 21, the second cup fitting zipper 23, and the third cup fitting zipper 24. As a result, each zipper closes when zipper heads meet at the middle and opens when the zipper heads move towards the top edge 29 and the bottom edge 30 of the breast plate 18. However, the second cup fitting zipper 23 is a two way opened-ended zipper while the first cup fitting zipper 21 and the third cup fitting zipper 24 are two way closed-ended zippers. In other words, a first zipper half and a second zipper half for the second cup fitting zipper 23 are engaged through a retainer pin and a retainer box similar to the plurality of fitting zippers 7 while the top end and the bottom end of the first cup fitting zipper 21 and the third cup fitting zipper 24 are fixed to the breast plate 18.

The first cup fitting zipper 21 and the third cup fitting zipper 24 each comprise a plurality of breast placement zippers 22 as shown in FIG. 5. More specifically, each of the plurality of breast placement zippers 22 is vertically positioned within the first cup fitting zipper 21 and the second cup fitting zipper 23 as each of the plurality of breast placement zippers 22 provides accurate measurements with respect to the shape and the size of the left breast and the right breast. The present invention utilizes two way closed-ended zippers as the plurality of breast placement zippers 22 so that each of the plurality of breast placement zippers 22 is able to provide a snug fit measurement for the breasts. The present invention preferably utilizes five breast placement zippers 22 while each of the breast placement zippers 22 is identified with a respective number or a respective color. For example, one of the plurality of breast placement zippers 22 can identified with the numeral 30 that represents the respective number or with the blue color that represents the respective color.

In reference to FIG. 4, the center panel section 25 that determines the correct cleavage comprises a left cleavage fitting zipper 26, a right cleavage fitting zipper 27, and a central cleavage fitting zipper 28. More specifically, the left cleavage fitting zipper 26, the right cleavage fitting zipper 27, and the central cleavage fitting zipper 28 are extended from the top edge 29 of the breast plate 18 to the bottom edge 30 of the breast plate 18. In reference to the exact positioning, the left cleavage fitting zipper 26 is adjacently positioned with the left breast panel section 19 while the right cleavage fitting zipper 27 is adjacently positioned with the right breast panel section 20. The central cleavage fitting zipper 28 is positioned in between the left cleavage fitting zipper 26 and the right cleavage fitting zipper 27. The present invention utilizes two way opened-ended zippers as the left cleavage fitting zipper 26, the right cleavage fitting zipper 27, and the central cleavage fitting zipper 28 so that the bra fitting specialist can measure three different cleavage measurements. Then the three different cleavage measurements can be utilized to attain a desired cleavage through the customized bra.

The left bra strap 31 and the right bra strap 32 are configured to be adjustable within the present invention so that the proper placement can be attained for the present invention. Additionally, the width of the left bra strap 31 and the right bra strap 32 can differ from one embodiment to another. For example, wider straps are used within the left bra strap 31 and the right bra strap 32 when the present invention is configured to measure larger sized breasts. However, narrow straps can be utilized within the left bra strap 31 and the right bra strap 32 when the present invention is configured to measure normal sized breasts.

Although the invention has been explained in relation to its preferred embodiment, it is to be understood that many other possible modifications and variations can be made without departing from the spirit and scope of the invention as hereinafter claimed.

What is claimed is:

1. A bra measurement system comprises:
   a left bra wing;
   a right bra wing;
   a breast plate;
   a left bra strap;
   a right bra strap;
   the left bra wing and the right bra wing each comprise a plurality of fitting zippers;
   the breast plate comprises a left breast panel section, a right breast panel section, and a center panel section;
   the left breast panel section being adjacently connected with the center panel section;
   the right breast panel section being adjacently connected with the center panel section, opposite of the left breast panel section;
   the left bra wing being adjacently connected with the left breast panel section;
   the right bra wing being adjacently connected with the right breast panel section;
   the left bra strap being connected between the left bra wing and a top edge of the breast plate; and
   the right bra strap being connected between the right bra wing and the top edge of the breast plate.

2. The bra measurement system as claimed in claim 1 comprises:
   the left bra wing and the right bra wing each further comprise a side panel, a top bra band, a bottom bra band, and a measuring tape;
   the top bra band and the bottom bra band for being oppositely extended along the side panel;
   the measuring tape being connected onto the side panel;
   the measuring tape being positioned in between the top bra band and the bottom bra band, adjacent to the breast plate;
   the plurality of fitting zippers being integrated onto the side panel; and
   the plurality of fitting zippers being extended from the top bra band to the bottom bra band.

3. The bra measurement system as claimed in claim 1 comprises:
   the plurality of fitting zippers comprises a first fitting zipper, a second fitting zipper, a third fitting zipper, and a fourth fitting zipper;
   the first fitting zipper being adjacently positioned with the breast plate;
   the second fitting zipper being adjacently positioned with the first fitting zipper, opposite of the breast plate;
   the third fitting zipper being adjacently positioned with the second fitting zipper, opposite of the first fitting zipper; and
   the fourth fitting zipper being adjacently positioned with the third fitting zipper, opposite of the second fitting zipper.

4. The bra measurement system as claimed in claim 3 comprises:
   the first fitting zipper, the second fitting zipper, the third fitting zipper, and the fourth fitting zipper each comprise a first zipper half, a second zipper half, a first increment zipper, a second increment zipper, a third increment zipper, and a fourth increment zipper;
   the first increment zipper being adjacently positioned with the first zipper half;
   the second increment zipper being adjacently positioned with the first increment zipper, opposite of the first zipper half;
   the third increment zipper being adjacently positioned with the second increment zipper, opposite of the first increment zipper; and
   the fourth increment zipper being adjacently positioned with the third increment zipper, opposite of the second increment zipper and adjacent to the second zipper half.

5. The bra measurement system as claimed in claim 3, wherein each of the plurality of fitting zippers are two way opened-ended zippers.

6. The bra measurement system as claimed in claim 1 comprises:
   the left breast panel section and the right breast panel section each comprise a first cup fitting zipper, a second cup fitting zipper, and a third cup fitting zipper;
   the first cup fitting zipper, the second cup fitting zipper, and the third cup fitting zipper being extended from the top edge of the breast plate to a bottom edge of the breast plate;
   the first cup fitting zipper being adjacently positioned with the center panel section;
   the second cup fitting zipper being adjacently positioned with the first cup fitting zipper, opposite of the center panel section; and
   the third cup fitting zipper being adjacently positioned with the second cup fitting zipper, opposite of the first cup fitting zipper.

7. The bra measurement system as claimed in claim 6, wherein the first cup fitting zipper and the third cup fitting zipper are two way closed-ended zippers.

8. The bra measurement system as claimed in claim 6, wherein the second cup fitting zipper is a two way opened-ended zipper.

9. The bra measurement system as claimed in claim 6 comprises:
   the first cup fitting zipper and the third cup fitting zipper each comprise a plurality of breast placement zippers; and
   each of the plurality of breast placement zippers being vertically positioned within the first cup fitting zipper and the second cup fitting zipper.

10. The bra measurement system as claimed in claim 1 comprises:
    the center panel section comprises a left cleavage fitting zipper, a right cleavage fitting zipper, and a central cleavage fitting zipper;
    the left cleavage fitting zipper, the right cleavage fitting zipper, and the central cleavage fitting zipper being extended from the top edge of the breast plate to a bottom edge of the breast plate;
    the left cleavage fitting zipper being adjacently positioned with the left breast panel section;

the right cleavage fitting zipper being adjacently positioned with the right breast panel section; and the central cleavage fitting zipper being positioned in between the left cleavage fitting zipper and the right cleavage fitting zipper.

11. The bra measurement system as claimed in claim 10, wherein the left cleavage fitting zipper, the right cleavage fitting zipper, and the central cleavage fitting zipper are two way opened-ended zipper.

12. The bra measurement system as claimed in claim 1, wherein the left bra wing and the right bra wing are engaged with each other through a plurality of fasteners.

\* \* \* \* \*